United States Patent [19]
Vankan et al.

[11] Patent Number: 5,665,815
[45] Date of Patent: Sep. 9, 1997

[54] POLYAMIDE COMPOSITIONS EXHIBITING IMPROVED RHEOLOGY

[75] Inventors: Robert Vankan, Liers; Philippe Degee, Grace-Hollogne; Robert Jerome, Esneux; Philippe Teyssie, Neuville-En-Condroz, all of Belgium

[73] Assignee: Solvay (Société Anonyme), Brussels, Belgium

[21] Appl. No.: 515,011

[22] Filed: Aug. 14, 1995

[30]       Foreign Application Priority Data

Aug. 16, 1994 [FR] France ........................ 94 10140

[51] Int. Cl.$^6$ .................... C08L 77/00; C08L 79/00
[52] U.S. Cl. ................ 524/600; 524/600; 524/607; 525/432
[58] Field of Search ................ 525/432; 524/600, 524/606, 607

[56]              References Cited

FOREIGN PATENT DOCUMENTS

| | | |
|---|---|---|
| 0283871 | 9/1988 | European Pat. Off. . |
| 0322560 | 7/1989 | European Pat. Off. . |
| 0514146 | 11/1992 | European Pat. Off. . |
| 3312936 | 10/1983 | Germany . |
| 93/06176 | 4/1993 | WIPO . |

*Primary Examiner*—Samuel A. Acquah
*Assistant Examiner*—P. Hampton-Hightower
*Attorney, Agent, or Firm*—Spencer & Frank

[57]            ABSTRACT

Compositions including at least one polyamide obtained by polycondensation of meta-xylylenediamine and of a dicarboxylic acid, as well as at least one copolymer based on methyl methacrylate and on acrylic and/or methacrylic acid, the said copolymer being advantageously at least partially neutralized with an alkali metal. These compositions exhibit a high melt viscosity at low shear rate, which facilitates their processing.

10 Claims, No Drawings

POLYAMIDE COMPOSITIONS EXHIBITING IMPROVED RHEOLOGY

FIELD OF THE INVENTION

The present invention relates to polyamide compositions exhibiting improved rheology and, more particularly, a high melt viscosity at low shear rate.

More particularly, the invention relates to compositions based on polyamide obtained by polycondensation of at least one xylylenediamine with one or more dicarboxylic acids (called "polyamide of the XD type" hereinafter). This type of polyamide is known for its remarkable (especially mechanical) properties.

TECHNOLOGY REVIEW

Polyamides are thermoplastic materials commonly employed in many applications, for example for the production of articles by the injection moulding or extrusion technique. It has been found, however, that in the particular case of polyamides of the "XD" type as defined above, practical problems often arise during the application of the these techniques. It has been found that these problems are, in fact, related to the rheological properties which these polyamides exhibit in the molten state; in particular, their melt viscosity is fairly low, including that at low shear rate. For example, in the case of poly(meta-xylylene adipamide), obtained by polycondensation of meta-xylylenediamine and of adipic acid (referred to by the abbreviation "mXD6" hereinafter), an apparent viscosity (at a shear rate of the order of 10 to 100 $s^{-1}$) of the order of 170 Pa s is measured in the melt (at 260° C.). This low viscosity undoubtedly facilitates the processing of this polymer but, during its injection or its extrusion, causes problems such as the formation of flash, which requires additional finishing stages.

For this reason it has appeared necessary to find a simple solution enabling the melt rheological properties of these polyamides to be improved and one which does not exhibit the abovementioned disadvantages. The present invention is aimed in particular at providing polyamide compositions of the XD type exhibiting a high melt viscosity at low shear rate ($\dot{\gamma} \leq 100$ $s^{-1}$), and whose melt viscosity at high shear rate is not simultaneously greatly increased.

SUMMARY OF THE INVENTION

To this end, the invention relates to a composition based on polyamide obtained by polycondensation of at least one xylylenediamine with at least one dicarboxylic acid, which is characterized in that it additionally includes at least one copolymer including methyl methacrylate and acrylic and/or methacrylic acid, the total quantity of acrylic and/or methacrylic acid in relation to the weight of this copolymer being not more than 30%.

DETAILED DESCRIPTION OF THE INVENTION

As xylylenediamines, it is possible, for example, to employ meta-xylylenediamine, para-xylylenediamine or a mixture of these. It is also possible to employ a mixture of one or more xylylenediamines with one or a number of other aliphatic diamines such as tetramethylenediamine or hexamethylenediamine, and/or with one or a number of aromatic diamines such as p-phenylenediamine, and/or with one or a number of alicyclic diamines such as 1,3-bisaminomethylcyclohexane. When one or a number of other diamines are employed jointly with one or more xylylenediamines, it is preferred that at least 60 %, and preferably at least 70 %, (on a molar basis) of the total quantity of diamines employed should nevertheless consist of xylylenediamine and still more particularly of meta-xylylenediamine. It is preferred to employ exclusively xylylenediamines and, still more particularly, meta-xylylenediamine.

One or a number of linear aliphatic $\alpha,\omega$-dicarboxylic acids containing from 4 to 12 carbon atoms, such as adipic acid or sebacic acid, are advantageously employed as dicarboxylic acids. It is also possible to employ one or a number of alicyclic or aromatic dicarboxylic acids such as, for example, cyclohexanedicarboxylic, isophthalic or terephthalic acids. It is possible to employ a single acid or a mixture of acids. Advantageously, the melting temperature of the acid or of the acid mixture employed does not exceed approximately 230° C. It is preferred to employ a linear aliphatic acid and in particular adipic acid.

As polyamide, it is preferred to employ poly(meta-xylylene adipamide), obtained by polycondensation of meta-xylylenediamine and of adipic acid ("mXD6").

A number of polyamides corresponding to the above definitions may optionally be employed as a mixture.

"Copolymer based on methyl methacrylate (MMA) and on acrylic and/or methacrylic acid", called "copolymer of the MMA-MAA type" hereinafter, is intended to denote any statistical copolymer including methyl methacrylate and acrylic and/or methacrylic acid as comonomers.

Copolymers of the MMA-MAA type which may be employed within the scope of the present invention may optionally include, besides MMA and acrylic and/or methacrylic acid, one or a number of other comonomers, in quantities advantageously not exceeding 10% by weight relative to the total weight of the copolymer, preferably lower than 5%.

However, it is preferred to employ copolymers containing exclusively MMA and acrylic and/or methacrylic acid and, still more particularly, copolymers based exclusively on MMA and on methacrylic acid.

The copolymer of the MMA-MAA type advantageously contains not more than 20% of acrylic and/or methacrylic acid (relative to its total weight), preferably not more than 15%. Moreover, this proportion is generally at least 1%, preferably at least 2%.

The copolymer of the MMA-MAA type is advantageously at least partially neutralized with at least one alkali or alkaline-earth metal. Such an at least partially neutralized copolymer, which therefore includes metal ions, is called an ionomer hereinafter.

Barium and calcium may be mentioned by way of non-limiting examples of alkaline-earth metals that may be employed, and lithium, caesium, sodium and potassium by way of alkali metals. It is preferred to employ a copolymer at least partially neutralized with at least one alkali metal. Potassium and caesium give remarkable results. The (acrylic and/or methacrylic) acid contents of the copolymers of the MMA-MAA type stated above apply also to the partially or completely neutralized copolymers. Within the abovementioned concentration ranges for the acid (acrylic and/or methacrylic, neutralized or not) in the copolymer of the MMA-MAA type, the optimum quantities depend especially on the nature of the acid, its degree of neutralization and the nature of the metal employed for the neutralization. These optimum quantities can easily be evaluated experimentally. Thus, for example, in the case of complete neutralization of the acid in copolymers of the MMA-MAA type, excellent results are obtained in the case of a weight content of acid not exceeding 10% by weight. The copolymer may be neutralized by any method known for this purpose. The alkali or alkaline-earth metal is preferably used in the form of an inorganic or organic compound, especially in the form of a salt of an inorganic or organic acid. The neutralization of the copolymer of the MMA-MAA type (or, more precisely, of its acrylic and/or methacrylic acid groups) may advantageously be performed by means of a metal salt, chosen preferably from the organic acid salts of the above-mentioned metals, for example from their acetates, their methanolates, and the like, or by means of a mixture of such salts. It is preferred to employ acetates. This inorganic or organic compound or the mixture of such compounds, is preferably employed in quantities that are equal to or smaller than the quantity stoichiometrically necessary for obtaining complete neutralization of the copolymer. The copolymer of the MMA-MAA type is preferably completely neutralized; this is how the maximum increase in the viscosity of the polyamide is obtained, and this allows very small quantities of copolymer to be employed.

A number of ionomers which differ (in the choice of the monomers and/or in that of the metal ions and/or in the degree of neutralization) may optionally be employed simultaneously, optionally as a mixture with one or a number of unneutralized copolymers of MMA-MAA type.

According to an advantageous alternative form of the invention, a total quantity of copolymer of the MMA-MAA type is employed which, in relation to the total weight of polyamide of the XD type and of copolymer of the MMA-MAA type, is generally at least 0.1%, preferably at least 0.5 %, and which is generally not more than 10 %. "Total quantity of copolymer" is intended to mean all of the copolymer(s) of the MMA-MAA type, whether neutralized or not, present in the composition.

Besides these essential constituents which are at least one polyamide of the XD type and at least one copolymer of MMA-MAA type, the compositions of the invention may further include one or more additives, for example conventional inorganic fillers such as calcium carbonate or talc, reinforcing fibres such as glass fibres and/or pigments.

The compositions of the invention may additionally also include one or a number of thermoplastic substances other than a polyamide of the XD type, for example one or a number of purely linear polyamides such as PA 6, PA 66, PA 12, and the like. However, it is preferred that they should include, as the only thermo-plastic materials, one or more copolymers of the MMA-MAA type and one or more polyamides obtained by polycondensation of at least one xylylenediamine and of at least one dicarboxylic acid.

The choice of the method of incorporation of the copolymer (or mixture of copolymers) of the MMA-MAA type in the polyamide(s) of the XD type is not critical. This incorporation may be performed by any known method, for example by mixing the various ingredients cold (in powder form) before they are melted, for example by extrusion or by kneading, or else by kneading the polyamide(s) so as to make them melt and by then incorporating the copolymer(s) in question therein. The incorporation of the latter may in some cases be facilitated by resorting to the well-known master batch technique, which consists in preparing beforehand a polyamide composition which has a high concentration of the desired copolymer(s). Accurate metering of the additive and its incorporation into the remainder of the composition are thus easier to carry out.

The present invention provides compositions based on polyamides of the XD type exhibiting a high melt viscosity at low shear rate ($\dot{\gamma} \leq 100$ $s^{-1}$), generally markedly higher than 850 Pa s, which makes it possible to eliminate the problems of flash during the moulding. Furthermore, this increase in the melt viscosity at low shear rate is accompanied by a moderate increase in the melt viscosity at high shear rate (in comparison with a composition free from copolymer of the MMA-MAA type), with the result that the compositions according to the invention retain good injectability properties. The solution provided comprises a number of advantages: first of all, it amounts to the incorporation of a single "additive" in these polyamides, namely the optionally neutralized copolymer or mixture of copolymers of the MMA-MAA type. Another advantage of the invention consists of the very small quantity of copolymer(s) which is needed, which makes it possible to keep virtually intact the remarkable properties (especially mechanical ones) of the polyamides of the XD type.

As announced above, the compositions thus defined result in appreciable advantages when they are employed for manufacturing articles by application of thermomechanical processing techniques such as injection moulding or extrusion. This is why the present invention also relates to a process for the manufacture of articles, including the thermomechanical processing of a composition as defined above, that is to say including at least one polyamide of the XD type and at least one copolymer of the MMA-MAA type as well as, advantageously, at least one alkali or alkaline-earth metal. Any known thermomechanical processing technique, for example injection, extrusion, and the like, may be employed. The thermomechanical processing of the compositions in accordance with the invention is markedly easier than that of compositions that might contain the same polyamide(s) of XD type but none of the copolymers described.

The present invention also relates to the articles obtained by the thermomechanical processing of the compositions described above, especially those obtained by injection moulding or by extrusion. It is in the case of processing using injection that the advantages of the invention are most noticeable.

EXAMPLES

The following examples illustrate the compositions of the invention, no limitation being implied.

In all the examples, the polyamide employed is PA mXD6 (Solvay) with a molecular mass of 17,500 and a melting temperature of 238° C.

The MMA-MAA copolymers employed were statistical MMA-methacrylic acid copolymers prepared by radical polymerization and exhibiting a molecular mass of approximately 18,500.

The neutralized copolymers were prepared by dissolving 2% by weight of the MMA-MAA copolymer in a toluene-methanol mixture, at 25° C., and by adding thereto an appropriate quantity of sodium or potassium acetate, as the case may be, dissolved beforehand in methanol. The acetic acid thus produced and the methanol were removed from the reaction mixture by three successive azeotropic distillations with toluene.

The polyamide/MMA-MAA copolymer compositions were finally prepared by melt-blending these two ingredients in a 60 cm³ laboratory blender of the Plasticorder® type (Brabender) at 260° C. and 50 revolutions per minute for approximately 10 minutes. All the compositions exemplified included 100 parts by weight of mXD6 polyamide and 5 parts of MMA-MAA copolymer.

In Examples 1 to 9 an MMA-methacrylic acid copolymer was employed in which the methacrylic acid content was 6.25 % by weight. In Examples 1 to 3 the copolymer was not neutralized. In Examples 4 to 9 it was stoichiometrically neutralized with potassium (4–6) or with sodium (7–9). The melt viscosity at 260° C. of these compositions at various shear rates was evaluated, as was, each time, that of the pure polyamide under the same conditions. The apparent melt viscosities were measured by capillary rheometry by means of a Rheograph®2001 apparatus from the company G öttfert, equipped with a capillary 1 mm in diameter, 20 mm in length and with an entry angle of 180°, and in which the plunger travels at a constant speed.

The conditions and results are summarized in the table below. The value of the ratio of the melt viscosity at 265° C. of the compositions evaluated to that of the pure polyamide under the same temperature and shear rate conditions appears in the last column.

| Example | Neutralization with a metal | Shear rate ($s^{-1}$) | Viscosity ratio |
|---|---|---|---|
| 1 | no | 10 | 12 |
| 2 | | 100 | 5 |
| 3 | | 1000 | 3 |
| 4 | potassium | 10 | 127 |
| 5 | | 100 | 20 |
| 6 | | 1000 | 5 |
| 7 | sodium | 10 | 42 |
| 8 | | 100 | 10 |
| 9 | | 1000 | 3 |

It is clearly ascertained that the melt viscosity of the compositions according to the invention is very markedly increased at low shear rate ($\gamma \leq 100$ $s^{-1}$) in relation to that of the polyamide by itself and, furthermore, that neutralization of the MMA-MAA copolymer, in particular with potassium, produces the best results.

In a second series of examples (10–14) copolymers which had a variable methacrylic acid content were employed. As in the preceding examples, the compositions tested included 100 parts of mXD6 polyamide and 5 parts of copolymer (by weight). In Examples 13 and 14 the copolymer was neutralized stoichiometrically with sodium.

The melt viscosity at 260° C. of the compositions and of the pure polyamide was measured at a constant shear rate of 10 $s^{-1}$. The conditions and results of Examples 10–14 are shown in the table below.

| Example | Acid content of the copolymer (%) | Neutralization with a metal | Viscosity ratio |
|---|---|---|---|
| 10 | 20 | no | 15 |
| 11 | 13 | | 34 |
| 12 | 5 | | 7.5 |
| 13 | 7 | sodium | 71 |
| 14 | 2 | | 8 |

The superior effectiveness of the neutralized copolymers of MMA-MAA type is clearly ascertained.

We claim:

1. A composition, comprising:

polyamide obtained by polycondensation of at least one xylylenediamine with at least one dicarboxylic acid, and at least one copolymer including methyl methacrylate, and an acid selected from the group consisting of acrylic acid, methacrylic acid, and mixtures thereof, the total quantity of acrylic and/or methacrylic acid relative to the weight of copolymer being not more than 30%, said copolymer at least partially neutralized with at least one alkali or alkaline-earth metal.

2. The composition according to claim 1, in which the total quantity of acrylic and/or methacrylic acid is at least 1% relative to the weight of the copolymer.

3. The composition according to claim 1, in which the total quantity of acrylic and/or methacrylic acid is at least 2% and not more than 20% relative to the weight of the copolymer.

4. The composition according to claim 1, in which the copolymer is at least partially neutralized with at least one alkali metal.

5. The composition according to claim 4, in which the alkali metal is potassium, caesium, and mixtures thereof.

6. The composition according to claim 1, in which the copolymer is completely neutralized.

7. The composition according to claim 1, in which the total quantity of copolymer is at least 0.1% relative to the total weight of polyamide and of copolymer.

8. The composition according to claim 1, in which the total quantity of copolymer is not more than 10% relative to the total weight of polyamide and of copolymer.

9. The composition according to claim 1, in which the polyamide is obtained by polycondensation of meta-xylylenediamine and of adipic acid.

10. In a process for the manufacture of articles, the improvement comprising thermomechanical processing of a composition according to claim 1.

* * * * *